US012654837B1

(12) United States Patent
Sibbach et al.

(10) Patent No.: US 12,654,837 B1
(45) Date of Patent: Jun. 16, 2026

(54) BLENDED WING BODY AIRCRAFT

(71) Applicant: General Electric Company, Evendale, OH (US)

(72) Inventors: Arthur William Sibbach, Boxford, MA (US); Brandon Wayne Miller, Middletown, OH (US); Egbert Geertsema, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/083,140

(22) Filed: Mar. 18, 2025

(51) Int. Cl.
| | |
|---|---|
| *B64C 1/40* | (2006.01) |
| *B64C 39/10* | (2006.01) |
| *B64D 15/12* | (2006.01) |

(52) U.S. Cl.
CPC ............... *B64C 1/40* (2013.01); *B64C 39/10* (2013.01); *B64D 15/12* (2013.01); *B64C 2039/105* (2013.01)

(58) Field of Classification Search
CPC ..... B64C 1/40; B64C 39/10; B64C 2039/105; B64C 1/26; B64D 27/40; B64D 27/10–32
See application file for complete search history.

(56) References Cited

U.S. PATENT DOCUMENTS

| | | | |
|---|---|---|---|
| 2,406,506 | A | 8/1946 | Northrop |
| 2,504,137 | A | 4/1950 | Lewis |
| 3,270,990 | A | 9/1966 | Webb |
| 4,019,699 | A | 4/1977 | Wintersdorff et al. |

| | | | |
|---|---|---|---|
| 5,897,078 | A | 4/1999 | Burnham et al. |
| 6,382,562 | B1 | 5/2002 | Whitlock et al. |
| 6,568,632 | B2 | 5/2003 | Page et al. |
| 6,708,924 | B2 | 3/2004 | Page et al. |
| 6,851,650 | B2 | 2/2005 | Sankrithi |
| 6,923,403 | B1 | 8/2005 | Dizdarevic et al. |
| 7,509,797 | B2 | 3/2009 | Johnson |
| 7,644,888 | B2 | 1/2010 | Eakins et al. |
| 7,665,689 | B2 | 2/2010 | McComb |
| 7,793,884 | B2 | 9/2010 | Dizdarevic et al. |
| 8,104,717 | B2 | 1/2012 | Wakayama et al. |

(Continued)

FOREIGN PATENT DOCUMENTS

| | | |
|---|---|---|
| CN | 108945416 A | 12/2018 |
| CN | 215064070 U | 12/2021 |

(Continued)

OTHER PUBLICATIONS

Koenig, Air Force Awards a Start-Up Company $235 Million to Build an Example of a Sleek New Plane, AP News, 2023, 2 Pages. https://apnews.com/article/air-force-aviation-streamlined-plane-blended-wing-2a1704dbe8a3ac112f36220eafe291fa.

*Primary Examiner* — Richard Green
*Assistant Examiner* — Nevena Aleksic
(74) *Attorney, Agent, or Firm* — Dority & Manning, P.A.

(57) ABSTRACT

A blended wing body aircraft defining a longitudinal direction, a lateral direction, and a vertical direction, the blended wing body aircraft including: a pair of wings; a body, the pair of wings extending outward from the body along the lateral direction, the body defining a top side along the vertical direction; and a propulsion system including a first engine mounted to the body on the top side of the body, the body including an acoustic treatment assembly forward of the first engine, aft of the first engine, or both.

17 Claims, 6 Drawing Sheets

(56)                References Cited

U.S. PATENT DOCUMENTS

| | | | |
|---|---|---|---|
| 8,128,023 | B2 | 3/2012 | Cazals |
| 8,251,310 | B2 | 8/2012 | Marche et al. |
| 8,317,129 | B1 | 11/2012 | Lawson et al. |
| 8,366,050 | B2 | 2/2013 | Odle et al. |
| 8,608,109 | B2 | 12/2013 | Campbell |
| 8,616,492 | B2 | 12/2013 | Oliver |
| 9,016,040 | B2 | 4/2015 | Stuart et al. |
| 9,168,716 | B2 | 10/2015 | Benedetti et al. |
| 9,567,075 | B2 | 2/2017 | Tighe |
| 9,779,715 | B1 * | 10/2017 | Seldal ................. G10K 11/172 |
| 9,815,559 | B2 | 11/2017 | Moxon |
| 10,711,631 | B2 | 7/2020 | Suciu et al. |
| 11,247,776 | B2 | 2/2022 | Princen et al. |
| 11,312,491 | B2 | 4/2022 | Morris et al. |
| 11,396,365 | B2 | 7/2022 | Page |
| 11,453,483 | B2 | 9/2022 | Page |
| 11,498,660 | B2 | 11/2022 | Florea et al. |
| 11,511,854 | B2 | 11/2022 | Baity et al. |
| 11,572,838 | B2 | 2/2023 | Miller et al. |
| 11,597,501 | B2 | 3/2023 | Page |
| 11,597,510 | B2 | 3/2023 | Robertson et al. |
| 11,608,173 | B2 | 3/2023 | McCullough et al. |
| 11,827,339 | B1 | 11/2023 | Page |
| 11,878,798 | B2 | 1/2024 | Atreya et al. |
| 11,926,410 | B2 | 3/2024 | Page et al. |
| 2007/0023571 | A1 | 2/2007 | Kawai et al. |
| 2011/0271824 | A1 | 11/2011 | Wahlquist |
| 2016/0009391 | A1 | 1/2016 | Friesel |
| 2016/0122005 | A1 | 5/2016 | Florea et al. |
| 2016/0144972 | A1 | 5/2016 | Florea et al. |
| 2017/0001708 | A1 * | 1/2017 | Alonso-Miralles .... B64D 27/14 |
| 2018/0362169 | A1 | 12/2018 | Du |
| 2019/0276135 | A1 | 9/2019 | van Merkensteijn, IV |
| 2019/0389581 | A1 * | 12/2019 | Chittick ................... B64C 3/14 |
| 2020/0331591 | A1 | 10/2020 | Page et al. |
| 2022/0194569 | A1 | 6/2022 | Georgeson et al. |
| 2023/0002037 | A1 | 1/2023 | Page |
| 2023/0029560 | A1 | 2/2023 | Stefes |
| 2023/0242254 | A1 | 8/2023 | Page |
| 2023/0257134 | A1 | 8/2023 | O'Leary et al. |
| 2023/0278706 | A1 * | 9/2023 | Page .................. B64C 29/0033 |
| | | | 244/102 R |
| 2023/0322382 | A1 * | 10/2023 | Dindar ................... B64C 21/01 |
| | | | 244/36 |

FOREIGN PATENT DOCUMENTS

| | | | |
|---|---|---|---|
| FR | | 2909358 A1 | 6/2008 |
| FR | | 2938823 A1 | 5/2010 |
| FR | | 2938824 A1 | 5/2010 |
| GB | | 759491 A | 10/1956 |
| WO | WO2007/104940 A1 | | 9/2007 |
| WO | WO2010/061071 A2 | | 6/2010 |
| WO | WO2021/118401 A1 | | 6/2021 |

* cited by examiner

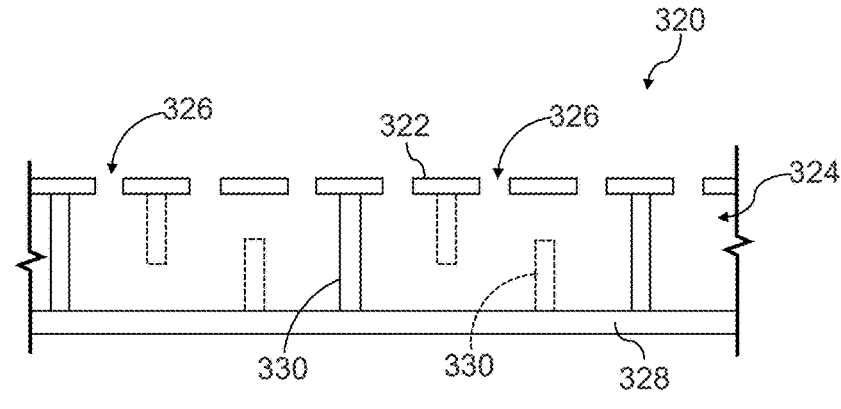
FIG. 5
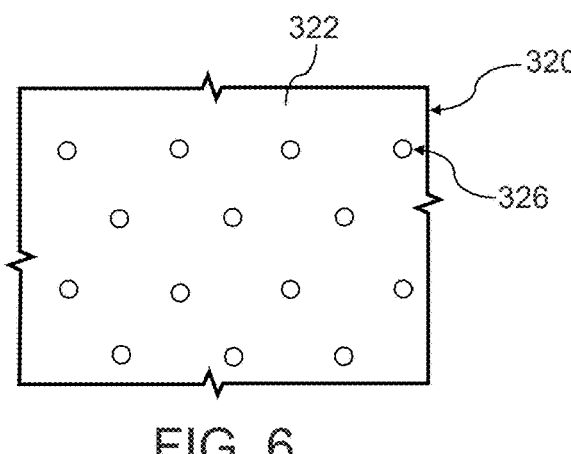
FIG. 6
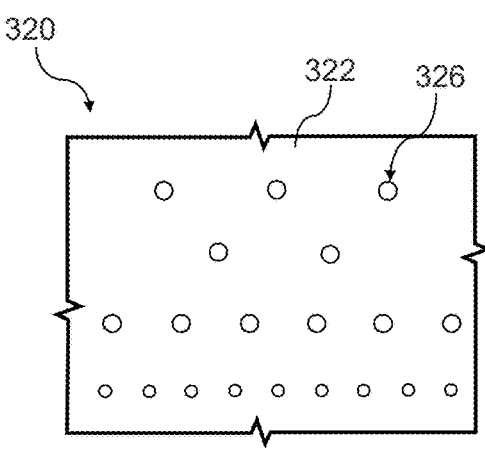
FIG. 8
FIG. 7

BLENDED WING BODY AIRCRAFT

FIELD

The present disclosure relates to a blended wing body aircraft that includes a propulsion system.

BACKGROUND

Traditional aircraft designs include a fuselage and a pair of wings. The fuselage is a central body of the aircraft that holds passengers, cargo, equipment, and the like. The wings are attached to the fuselage and are the primary lift-generating surfaces, particularly during constant-altitude flight operations. The aircraft can include engines mounted to the wings to generate thrust for the aircraft, and a tail assembly having a vertical stabilizer and a horizontal stabilizer for vector control. While such an aircraft design is a well-established and proven design, improvements to allow for increased efficiency and cargo utilization would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 5 is a schematic view of an acoustic treatment in accordance with an exemplary aspect of the present disclosure.

FIG. 6 is a schematic view of an acoustic treatment in accordance with another exemplary aspect of the present disclosure.

FIG. 7 is a schematic view of an acoustic treatment in accordance with yet another exemplary aspect of the present disclosure.

FIG. 8 is a schematic view of an acoustic treatment in accordance with still another exemplary aspect of the present disclosure.

DETAILED DESCRIPTION

Figure 1:
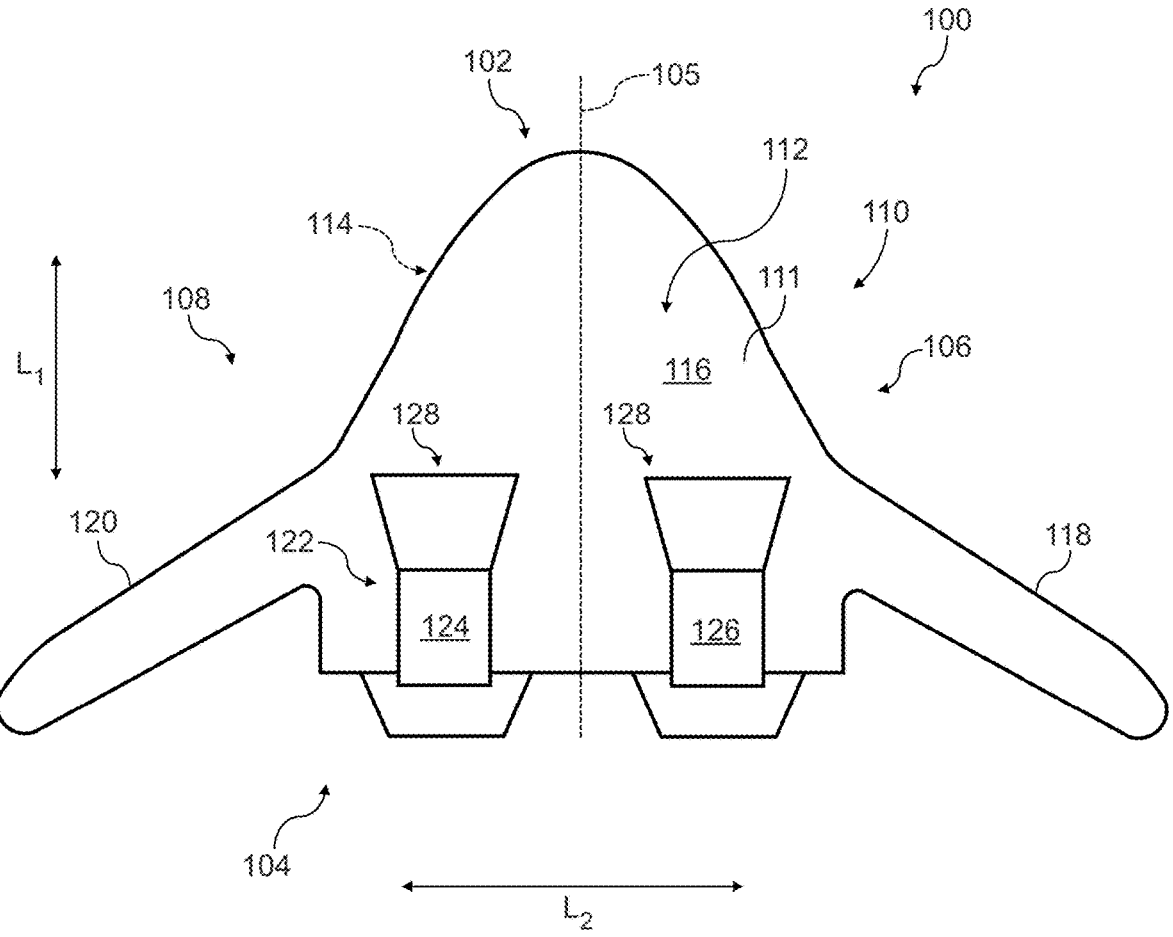
FIG. 1 is a top, schematic view of an aircraft in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The phrases "from X to Y" and "between X and Y" each refers to a range of values inclusive of the endpoints (i.e., refers to a range of values that includes both X and Y).

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "forward" and "aft" refer to relative positions within a gas turbine engine or vehicle, and are based on a normal operational attitude of the gas turbine engine or vehicle. More particularly, forward and aft are used herein are with reference to a direction of travel and a direction of propulsive thrust of the gas turbine engine or vehicle.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

As noted above, improvements to traditional aircraft design to allow for increased efficiency and cargo utilization would be welcomed in the art. The inventors of the present disclosure found that utilization of a blended wing aircraft design can provide such an improvement. In particular, with the blended wing aircraft design, a body of the aircraft can contribute to lift, while also allowing for increased cargo space, improved aerodynamic efficiency, etc.

With the blended wing aircraft design, engines of the aircraft can be mounted on a top side of the body, allowing for the body to block at least a portion of the noise from the engines from impacting community locations, among other benefits. Notably, however, acoustic sound waves may bounce off the body and contribute to community noise of the aircraft, resonate into an interior of the aircraft, or both. Accordingly, the present disclosure provides for a blended wing aircraft design including an acoustic treatment assembly forward of an engine of the aircraft's propulsion system, aft of the engine, or both. Such an arrangement may reduce a community noise generated by the aircraft, may reduce a noise level within an interior of the aircraft, or both.

Referring now to the drawings, wherein identical numerals indicate the same elements throughout the figures, FIG. 1 provides a top view of an aircraft 100 as may incorporate various embodiments of the present disclosure. In particular, as will be discussed in greater detail, below, the aircraft 100 of FIG. 1 is configured as a blended wing aircraft.

The aircraft 100 defines a longitudinal direction $L_1$ that extends therethrough, a lateral direction $L_2$, a vertical direction V (see, e.g., FIG. 4, below), a forward end 102 and an opposing aft end 16 along the longitudinal direction $L_1$, a longitudinal centerline 105 along the longitudinal direction $L_1$, a starboard side 106 and an opposing port side 108 along the lateral direction $L_2$, and a top side 112 and an opposing bottom side 114 (indicated by a phantom lead line) along the vertical direction V.

Further, it will be appreciated that the aircraft 100 includes a body 110 extending longitudinally from the forward end 102 of the aircraft 100 to the aft end 104 of the aircraft 100, the body 110 including a fuselage 111 and a pair of wings. In particular, the aircraft 100 includes a first wing 118 and a second wing 120. The first wing 118 extends outwardly from the fuselage 111 generally along the lateral direction $L_2$ on the starboard side 106 and the second wing 120 similarly extends outwardly from the fuselage 111 generally along the lateral direction $L_2$ on the port side 108. Although not depicted, it will be appreciated that each of the wings 118, 120 may include one or more leading edge flaps, one or more trailing edge flaps, or both.

The exemplary aircraft 100 of FIG. 1 also includes a propulsion system 122. The exemplary propulsion system 122 depicted includes a plurality of engines, and more specifically includes a first engine 124 and a second engine 126. In the embodiment depicted, the first engine 124 and the second engine 126 are spaced from one another along the lateral direction $L_2$, and are mounted to the fuselage 111 of the aircraft 100 at the aft end 104 of the aircraft 100. It will be appreciated, that as used herein, the term "at the aft end 104" refers to a location along the longitudinal direction $L_1$ closer to the aft end 104 of the aircraft 100 than the forward end 102 of the aircraft 100. Briefly, it will further be appreciated that for the embodiment depicted, the first engine 124 and second engine 126 are mounted to the fuselage 111 of the body 110 of the aircraft 100 on the top side 112 of the aircraft 100.

It will be appreciated, however, that in other exemplary embodiments, the first engine 124 and second engine 126 may be mounted to the fuselage 111, e.g., on a bottom side 114. Further, although the first engine 124 and second engine 126 are coupled to the fuselage 111 in the embodiment shown, in other embodiments, they may be formed integrally with the fuselage 111.

As noted above, the aircraft 100 is configured as a blended wing aircraft. In such a manner, it will be appreciated that the body 110 of the aircraft 100 is generally shaped like an airfoil, such that the body 110 of the aircraft 100 generates upward lift (along the vertical direction V) during steady altitude flight operations. For example, during a cruise operating condition of the aircraft 100, the body 110 may contribute between 10% and 95% of the upward lift for the aircraft 100, such as between 25% and 90% of the upward lift for the aircraft 100, with the remainder being provided by the first and second wings 118, 120. In addition, the first and second wings 118, 120 are aerodynamically contoured to have a smooth transition with the body 110 of the aircraft 100, which can reduce an overall drag on the aircraft 100.

Referring still to FIG. 1, it will be appreciated that the body 110 of the aircraft 100 further includes an acoustic treatment assembly 128. The acoustic treatment assembly 128 is positioned forward of the first engine 124, aft of the first engine 124, or both. Similarly, for the embodiment depicted, the acoustic treatment assembly 128 is positioned forward of the second engine 126, aft of the second engine 126, or both.

Figure 2:
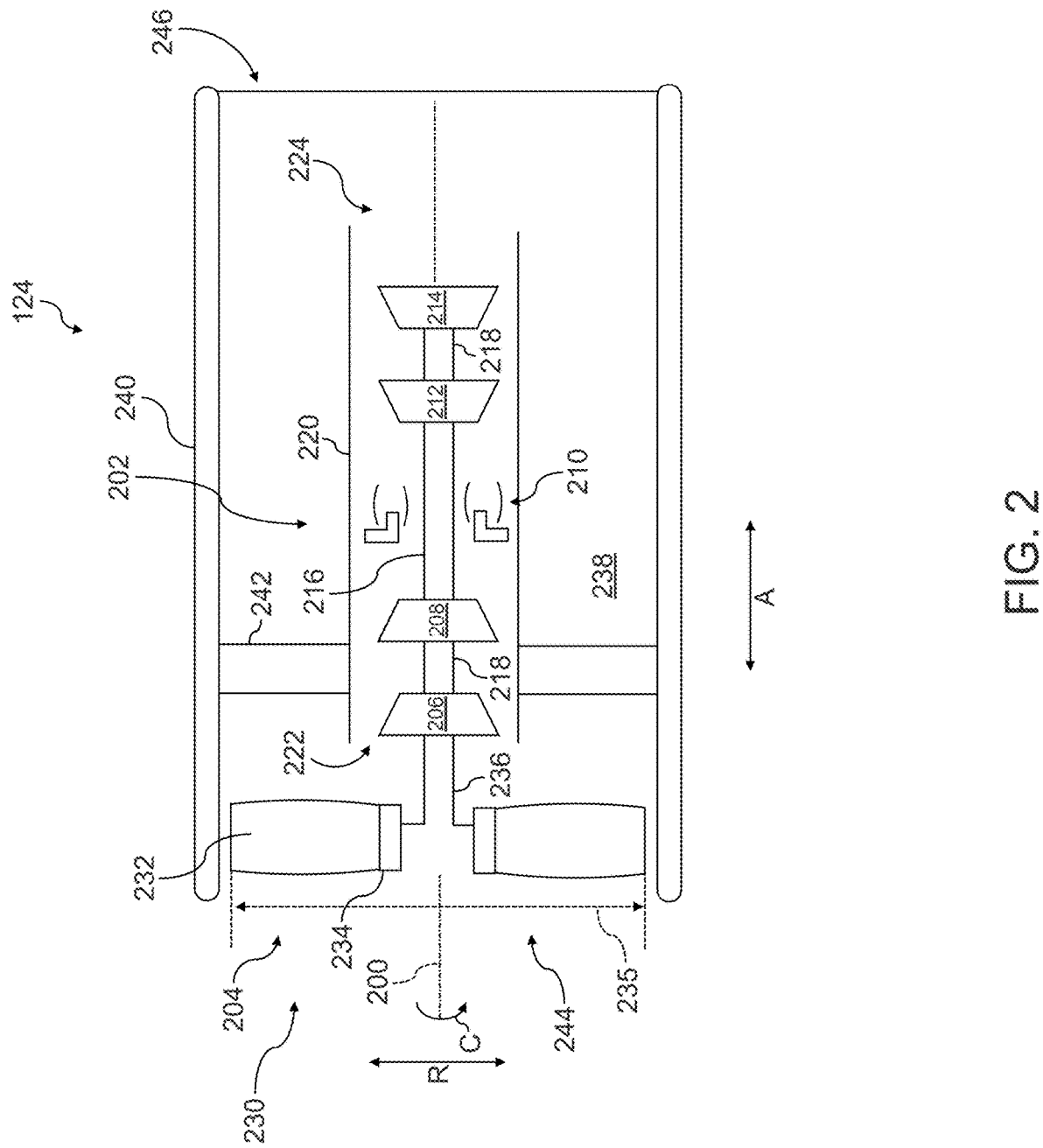
FIG. 2 is a schematic, cross-sectional view of a first engine of a propulsion system of the aircraft of FIG. 1 in accordance with an exemplary embodiment of the present disclosure.

Referring now to FIG. 2, a schematic cross-sectional view of the first engine 124 of the propulsion system 122 of the aircraft 100 of FIG. 1 is presented.

It will be appreciated that although the first engine 124 is discussed, the second engine 126 may be configured in a similar manner as one or more of these embodiments.

The first engine 124 is configured as a gas turbine engine. For example, the first engine 124 includes a turbomachine 202 and a fan assembly 204, and defines an axial direction A, a radial direction R, and a circumferential direction C. The fan assembly 204 includes a fan 230 positioned proximate a forward end of the first engine 124.

The turbomachine 202 of the gas turbine engine defines a turbomachine inlet 222 and a turbomachine exhaust 224, and includes a compressor section, a combustion section 210, and a turbine section. The compressor section includes a low-pressure compressor 206 and a high-pressure compressor 208. The combustion section 210 receives compressed air from the compressor section and mixes it with fuel for combustion, thereby generating high-energy exhaust gases. These exhaust gases then flow into the turbine section, which includes a high-pressure turbine 212 and a low-pressure turbine 214. The high-energy exhaust gases expand through the turbine section, causing the turbines to rotate and produce mechanical work. In particular, it will be appreciated that for the embodiment shown, the turbomachine 202 further includes a high pressure shaft 216 extending between and mechanically coupling the high-pressure compressor 208 and high pressure turbine 212, and a low pressure shaft 218 extending between and mechanically coupling the low pressure compressor 206 and low pressure turbine 214.

As noted, the fan assembly 204 includes the fan 230 and defines an engine inlet 244. The fan 230 in turn includes a plurality of fan blades 232 and a fan disk 234, with the plurality of fan blades 232 coupled to the fan disk 234. The fan assembly 204 further includes a fan shaft 236 mechanically coupling the turbomachine 202 with the fan 230 (via, e.g., one or more of the low pressure compressor 206 or low pressure shaft 218). The plurality of fan blades 232 define a fan diameter 235 along the radial direction R.

The gas turbine engine 124 further includes a nacelle 240 that encloses the fan 230 and defines in part the engine inlet 244, and further defines an engine exhaust 246 for the embodiment shown. The nacelle 240 surrounds the fan 230 and is coupled to the turbomachine 202 through a plurality of inlet guide vanes 242 located upstream of the fan blades 232 of the fan 230. In such a manner, it will be appreciated that the gas turbine engine of FIG. 2 is more specifically configured as a turbofan engine.

Moreover, the nacelle 240 surrounds the turbomachine 202 and defines a bypass passage 238 with an outer casing 220 of the turbomachine 202. Notably, it will be appreciated that the gas turbine engine 124 depicted in FIG. 2 is a mixed flow engine, meaning that an airflow from the bypass passage 238 and an airflow from the turbomachine exhaust 224 are mixed together prior to flowing out of the engine exhaust 246. In particular, for the embodiment depicted, the nacelle 240 extends aft of the turbomachine exhaust 224 to provide such functionality.

It will be appreciated that the first engine 124 generally includes a forward end and an aft end. The engine inlet 244 is located at the forward end, and the engine exhaust 246 is located at the aft end. As used herein, the forward end of an engine refers to a forward-most location of the engine, and conversely the aft end of the engine refers to an aft-most location of the engine.

Figure 3:
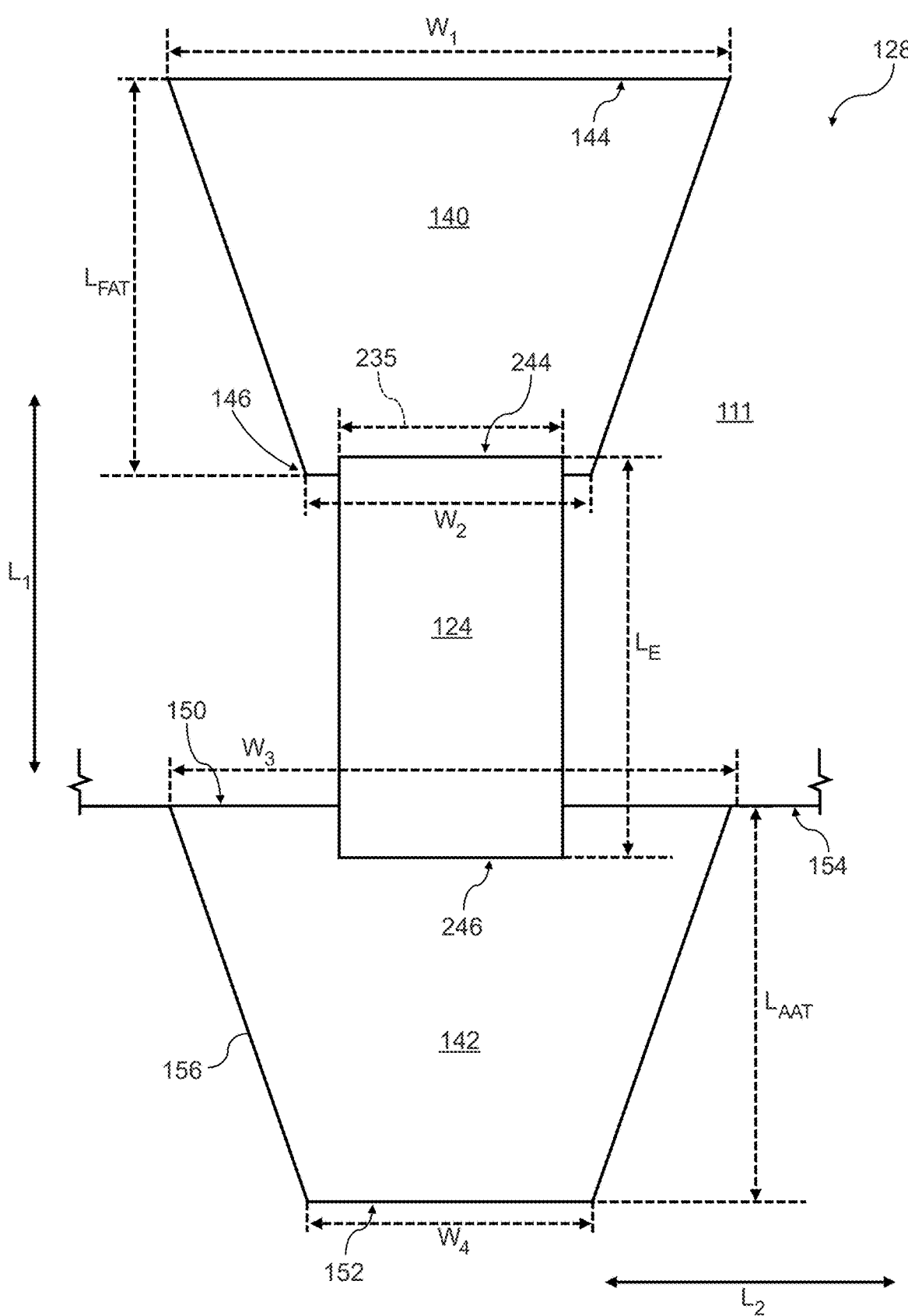
FIG. 3 is a close-up, schematic view of the first engine of FIGS. 1 and 2, along with an acoustic treatment assembly of FIG. 1.

Referring now to FIG. 3, a close-up, schematic view is provided of the first engine 124 of FIGS. 1 and 2, along with the acoustic treatment assembly 128 of FIG. 1. As noted with respect to FIG. 1, the acoustic treatment assembly 128 is positioned forward of the first engine 124, aft of the first engine 124, or both, and in particular for the embodiment of FIG. 3, the acoustic treatment assembly 128 is positioned forward of the first engine 124 and aft of the first engine 124.

More specifically, the acoustic treatment assembly 128 includes a forward acoustic treatment 140 positioned at the forward end of the first engine 124 and an aft acoustic treatment 142 positioned at the aft end of the first engine 124. It will be appreciated that as used herein, the term "at" in the context of locating an acoustic treatment relative to a forward end or an aft end of an engine, refers to at least a portion of the acoustic treatment being aligned with or overlapping a respective one of the forward or aft end of the engine along the longitudinal direction $L_1$, or having a separation along the longitudinal direction $L_1$ between the acoustic treatment and the respective one of the forward or aft end of the engine being less than 20% of a length of the engine along the longitudinal direction $L_1$. The length of the engine along the longitudinal direction $L_1$ refers to a length between the forward end and the aft end along the longitudinal direction $L_1$. As noted above, the forward end of the first engine 124 is defined by the engine inlet 244 (a forward-most location of the engine inlet 244) and the aft end of the first engine 124 is defined by the engine exhaust 246 (an aft-most location of the engine exhaust 246).

Referring particularly to the forward acoustic treatment 140, the forward acoustic treatment 140 extends between a first end 144 and a second end 146 along the longitudinal direction $L_1$, and defines a length, $L_{FAT}$, between the first end 144 and second end 146 along the longitudinal direction $L_1$. Further, the first engine 124 defines a length, $L_E$, along the longitudinal direction $L_1$, the length being a length along the longitudinal direction $L_1$ between the forward end and aft end of the first engine 124. For the embodiment depicted, the length, $L_{FAT}$, is at least 5% of the length, $L_E$, and up to 100% of the length, $L_E$.

Moreover, as will be appreciated from the embodiment of FIG. 3, the forward acoustic treatment 140 defines a first width $W_1$ at the first end 144 and a second width $W_2$ at the second end 146. The first width $W_1$ is greater than the fan diameter 235 (see also, FIG. 2) and the up to 300% of the fan diameter 235. The second width $W_2$ is at least 85% of the fan diameter 235 and up to 200% of the fan diameter 235. The second width $W_2$ is less than the first width $W_1$.

In such a manner, the forward acoustic treatment 140 may be configured to absorb or dampen a meaningful portion of acoustic waves emanating from the forward end of the first engine 124 to reduce an impact on community noise from the first engine 124, reduce an impact on cabin noise from the first engine 124 or both.

Moreover, referring particularly to the aft acoustic treatment 142, the aft acoustic treatment 142 extends between a first end 150 and a second end 152 along the longitudinal direction $L_1$, and defines a length, $L_{AAT}$, between the first end 150 and second end 152 along the longitudinal direction $L_1$. For the embodiment depicted, the length, $L_{AAT}$, is at least 5% of the length, $L_E$, and up to 100% of the length, $L_E$.

Moreover, as will be appreciated from the embodiment of FIG. 3, the aft acoustic treatment 142 defines a third width $W_3$ at the first end 150 and a fourth width $W_4$ at the second end 152. The third width $W_3$ is greater than the fan diameter 235 and the up to 300% of the fan diameter. The fourth width $W_4$ is at least 25% of the fan diameter 235 and up to 200% of the fan diameter 235. The fourth width $W_4$ is less than the third width $W_3$.

In such a manner, the aft acoustic treatment 142 may similarly be configured to absorb or dampen a meaningful portion of acoustic waves emanating from the aft end of the first engine 124 to reduce an impact on community noise from the first engine 124, reduce an impact on cabin noise from the first engine 124 or both.

Notably, the fuselage 111 of the aircraft 100 defines an aft edge 154, and in the embodiment depicted, the aft end of the first engine 124 (e.g., the engine exhaust 246) extends aft of the aft edge 154 of the fuselage 111. In order to also allow for the aft acoustic treatment 142 to extend aft of the aft edge 154 of the fuselage 111, and aft of the aft end of the first engine 124, the body 110 of the aircraft 100 further includes a fuselage extension 156 extending aft from the aft edge 154 of the fuselage 111. For the embodiment depicted, the aft acoustic treatment 142 is positioned at least partially on or within the fuselage extension 156.

Figure 4:
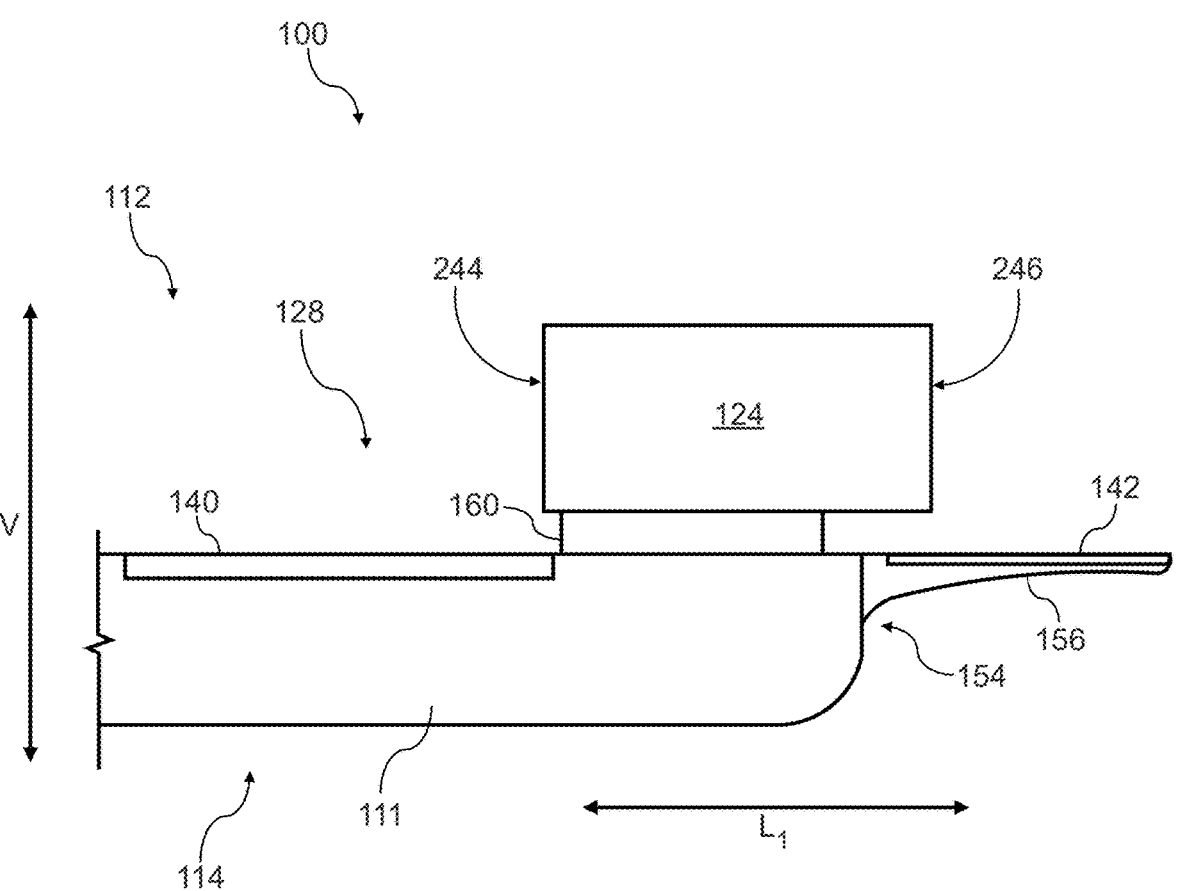
FIG. 4 is a schematic side view of a portion of the aircraft of FIG. 1 including the first engine and acoustic treatment assembly of FIG. 3.

In particular, referring now briefly to FIG. 4, a schematic side view of a portion of the aircraft 100 including the first engine 124 and acoustic treatment assembly 128 is provided. As will be appreciated, for the embodiment depicted, the aft acoustic treatment 142 is positioned at least partially on or within the fuselage extension 156, which is coupled to or formed with the fuselage 111 at the aft edge 154 of the fuselage 111.

Moreover, as will be appreciated from the views of FIGS. 3 and 4, the forward acoustic treatment 140 extends aft of the forward end of the first engine 124 (the forward end located at the forward-most location of the engine inlet 244) on a surface of the fuselage (on a top surface of the fuselage) and the aft acoustic treatment 142 extends forward of the aft end of the first engine 124 (the aft end located at the aft-most location of the engine exhaust 246). As the first engine 124 is mounted to the fuselage 111 through a mounting structure 160 (e.g., a pylon) that spaces the first engine 124 from the top side of the fuselage 111, such an arrangement of the forward acoustic treatment 140 and aft acoustic treatment 142 can provide for a desired reduction in noise from the first engine 124.

As will be appreciated, the aft acoustic treatment 142 may be exposed to relatively high temperatures during operation of the first engine 124 by virtue of its location relative to an exhaust of the first engine 124. In such a manner, the aft acoustic treatment 142 may be formed of a high temperature material. As used herein, the term "high temperature material" refers to a material capable of withstanding elevated temperatures, e.g., temperatures in excess of 300 degrees Fahrenheit, without significant deformation, fracturing, or corrosion. Exemplary high temperature materials include, but are not limited to: steel, titanium, ceramic matric composite, oxide-oxide ceramic composite, and nickel based alloys like inconel 625, inconel 718.

Further, it will be appreciated that an acoustic treatment of the present disclosure (e.g., the forward acoustic treatment 140, aft acoustic treatment 142, or both) may have any suitable structure to absorb or otherwise attenuate acoustic energy. For example, in at least certain exemplary embodiments, an acoustic treatment 320 in accordance with an exemplary embodiment of the present disclosure may include a perforated sheet 322 with a hollow body 324. In particular, referring now to FIG. 5, a schematic, cross-sectional view is provided of an acoustic treatment 320 in accordance with an exemplary aspect of the present disclosure. As shown in the embodiment of FIG. 5, the exemplary acoustic treatment 320 includes the perforated sheet 322 and the hollow body 324. The hollow body 324 includes a liner 328 defining an interior void adjacent to the perforated sheet 322. The perforated sheet 322 defines a plurality of openings 326 allowing an external environment to communicate with the interior void of the hollow body 324. Acoustic waves may enter the hollow body 324 through the plurality of openings 326, allowing for an attenuation of the noise generated by or through interaction with an engine of the aircraft.

The perforated sheet 322 is coupled to the liner 328 through a plurality of extensions 330 extending from the perforated sheet 322 to the liner 328. In certain exemplary embodiments, the acoustic treatment 320 may further include additional structures to increase noise attenuation achieved by the acoustic treatment 320 at desired frequencies. The additional structures may be walls or other extensions 330 (depicted in phantom) extending from the perforated sheet 322, extending from the liner 328, or both; may be perforations in the walls or extensions 330; may be additional or alternative walls or extensions 330; etc.

Referring now to FIG. 6, a schematic, a top view is provided of a perforated sheet 322 in accordance with an exemplary aspect of the present disclosure. The perforated sheet 322 may include a plurality of openings 326 spaced in a uniform manner.

Referring now to FIG. 7, a schematic, a top view is provided of a perforated sheet 322 accordance with another exemplary aspect of the present disclosure. As will be appreciated from the view of FIG. 7, the plurality of openings 326 of the perforated sheet 322 may define a noncircular shape, such as an elongated or ovular shape.

Referring now to FIG. 8, a schematic, a top view is provided of a perforated sheet 322 in accordance with yet another exemplary embodiment of the present disclosure. As will be appreciated from the view of FIG. 8, the plurality of openings 326 may define a nonuniform size and a nonuniform spacing. Such a configuration may, e.g., allow for the acoustic treatment 320 to target noise at various frequencies.

Figure 9:
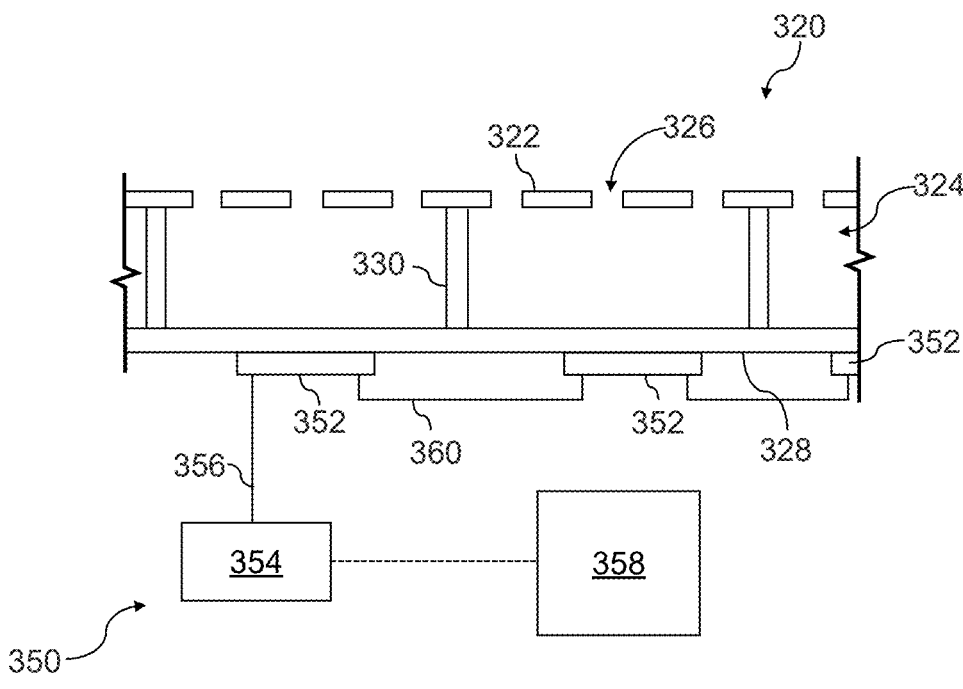
FIG. 9 is a schematic view of an acoustic treatment in accordance with another exemplary aspect of the present disclosure.

Notably, in one or more of the above exemplary acoustic treatments 320 including a perforated sheet 322 with a hollow body 324 may be susceptible to damage by virtue of ice formation within the hollow body 324. Referring now to FIG. 9, an exemplary embodiment of an acoustic treatment assembly 128 is provided, where the aircraft further includes an anti-icing assembly 350. The anti-icing assembly 350 includes a heater 352 in thermal communication with the acoustic treatment 320. Further, in the embodiment depicted, the anti-icing assembly 350 includes a heat source 354 and a connection 356 extending from the heat source 354 to the heaters 352.

Moreover, as is depicted schematically, the anti-icing assembly 350 is in operable communication with a controller 358, which may be a controller for an engine located upstream or downstream of the acoustic treatment assembly 128, or an aircraft controller. The controller 358 may provide signals to the heat source 354 to modulate an amount of heat provided to the acoustic treatment 320 to melt ice or prevent ice formation, e.g., in response to received data indicative of an ambient condition, an operating condition of the engine or aircraft, or a combination thereof.

A controller 358, as used herein, refers to a device or component that manages and directs the operation of other devices or systems. It includes one or more processors that execute instructions and perform computations, as well as memory that stores these instructions and other data necessary for the functioning of the controller. The controller may receive input from external sources (e.g., other controllers, sensors, etc.), process this input according to predefined algorithms stored in the memory, and generate appropriate output to control the operation of connected devices or systems, including the anti-icing assembly 250. The inclusion of processors and memory enables the controller to perform complex tasks and adapt to varying conditions in a reliable and efficient manner.

Referring still to FIG. 9, the heater 352 of the anti-icing assembly 350 is, for the embodiment depicted, a plurality of heaters 352 coupled to (both mechanically and thermally) a liner 328 of the hollow body 324 so as to transfer heat to the acoustic treatment 320.

Additionally, in certain embodiments, the heater(s) 352 can be electric resistance heater(s), such that the heat source 354 is an electric power source (e.g., an on-board power source or a ground power source) and the connection 356 is an electrical connection. Each of the plurality of heaters 352 is connected to one another through an electric line 360, such that each heater 352 is connected to the heat source 354.

Alternatively, the heat source 354 can be a hot air source (e.g., an engine bleed, or ground source), such that the heaters 352 are ducts that provide for thermal communication between a hot air flow and the acoustic treatments 320.

Inclusion of the anti-icing assembly 350 can prevent or limit ice formation within the hollow body 324 (from water received through a plurality of openings 326), which may expand and damage the acoustic treatment 320. Additionally, when incorporated into an acoustic treatment 320 located at a forward end of an engine (e.g., a forward acoustic treatment see FIG. 2), inclusion of the anti-icing assembly 350 can prevent or limit ice formation on a surface that may otherwise be ingested by the engine, potentially damaging the engine.

Figure 10:
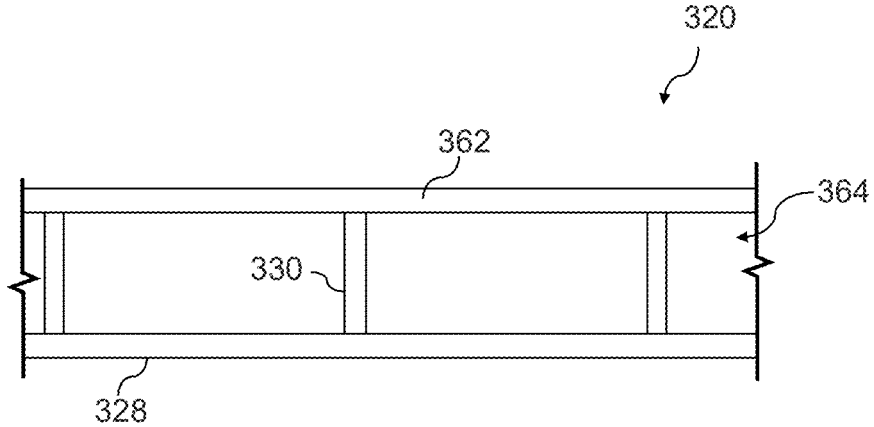
FIG. 10 is a schematic view of an acoustic treatment in accordance with yet another exemplary aspect of the present disclosure.

Referring now to FIG. 10, an acoustic treatment 320 of an acoustic treatment assembly in accordance with another exemplary aspect of the present disclosure is provided. The exemplary acoustic treatment 320 may be configured in a similar manner as one or more of the exemplary acoustic treatments 320 discussed hereinabove. However, for the embodiment depicted in FIG. 10, the acoustic treatment 320 includes a closed-cell body 364. In particular, the acoustic treatment 320 includes a non-perforated sheet 362 with a closed-cell body 364. The closed-cell body 364 includes a liner 328 defining an interior void adjacent to the non-perforated sheet 362.

The non-perforated sheet 362 is coupled to the liner 328 through a plurality of extensions 330 extending from the non-perforated sheet 362 to the liner 328. In certain exemplary embodiments, the acoustic treatment 320 may further include additional structures to increase noise attenuation achieved by the acoustic treatment 320 at desired frequencies. The additional structures may be walls or other extensions extending from the non-perforated sheet 362, extending from the liner 328, or both; may be perforations in the walls or extensions 330; may be additional or alternative walls or extensions 330; etc. With such an arrangement, the non-perforated sheet 362 may be a relatively thin sheet allowing noise waves to pass therethrough and be attenuated by the structure of the closed-cell body 364.

Further aspects are provided by the subject matter of the following clauses:

A blended wing body aircraft defining a longitudinal direction, a lateral direction, and a vertical direction, the blended wing body aircraft comprising: a pair of wings; a body, the pair of wings extending outward from the body along the lateral direction, the body defining a top side along the vertical direction; and a propulsion system comprising a first engine mounted to the body on the top side of the body, the body including an acoustic treatment assembly forward of the first engine, aft of the first engine, or both.

The blended wing body aircraft of any of the preceding clauses, wherein the first engine includes a forward end and an aft end, wherein the acoustic treatment assembly includes a forward acoustic treatment positioned at the forward end of the first engine on a surface of the body.

The blended wing body aircraft of any of the preceding clauses, wherein the forward acoustic treatment defines a length, $L_{FAT}$, along the longitudinal direction, wherein the first engine defines a length, $L_E$, along the longitudinal direction, and wherein the length, $L_{FAT}$, is at least 5% of the length, $L_E$, and up to 100% of the length, $L_E$.

The blended wing body aircraft of any of the preceding clauses, wherein the forward acoustic treatment overlaps with the forward end of the first engine along the longitudinal direction.

The blended wing body aircraft of any of the preceding clauses, wherein the first engine includes a forward end and an aft end, wherein the acoustic treatment assembly includes an aft acoustic treatment positioned at the aft end of the first engine.

The blended wing body aircraft of any of the preceding clauses, wherein the aft acoustic treatment defines a length, $L_{AAT}$, along the longitudinal direction, wherein the first engine defines a length, $L_E$, along the longitudinal direction, and wherein the length, $L_{AAT}$, is at least 5% of the length, $L_E$, and up to 100% of the length, $L_E$.

The blended wing body aircraft of any of the preceding clauses, wherein the aft acoustic treatment overlaps with the aft end of the first engine along the longitudinal direction.

The blended wing body aircraft of any of the preceding clauses, wherein the body includes a fuselage having an aft edge and a fuselage extension extending aft from the aft edge, wherein the aft acoustic treatment is positioned at least partially on or within the fuselage extension.

The blended wing body aircraft of any of the preceding clauses, wherein the aft acoustic treatment is formed of a high temperature material.

The blended wing body aircraft of any of the preceding clauses, wherein the first engine includes a forward end and an aft end, wherein the acoustic treatment assembly includes a forward acoustic treatment positioned at the forward end of the first engine on a surface of the body and an aft acoustic treatment positioned at the aft end of the first engine.

The blended wing body aircraft of any of the preceding clauses, wherein the acoustic treatment assembly includes an acoustic treatment, wherein the acoustic treatment comprises a perforated sheet and a hollow body.

The blended wing body aircraft of any of the preceding clauses, wherein the acoustic treatment assembly includes an acoustic treatment, wherein the acoustic treatment comprises a closed-cell body.

The blended wing body aircraft of any of the preceding clauses, wherein the acoustic treatment assembly includes an acoustic treatment, and wherein the aircraft further comprises: an anti-icing assembly, the anti-icing assembly including a heater in thermal communication with the acoustic treatment.

The blended wing body aircraft of any of the preceding clauses, wherein the propulsion system further comprises a second engine mounted to the body on the top side of the body and spaced from the first engine along the lateral direction, wherein the acoustic treatment assembly is also positioned forward of the second engine, aft of the second engine, or both.

The blended wing body aircraft of any of the preceding clauses, wherein during a cruise operating condition of the aircraft, the body contributes between 10% and 95% of an upward lift for the aircraft.

An acoustic treatment assembly for a blended wing body aircraft, the blended wing body aircraft comprising a body, a pair of wings extending outward from the body, and a propulsion system, the propulsion system comprising a first engine mounted to the body on a top side of the body, the acoustic treatment assembly comprising: a forward acoustic treatment configured to be position at a forward end of the first engine when the acoustic treatment assembly is installed in the blended wing body aircraft; and an aft acoustic treatment configured to be position at an aft end of the first engine when the acoustic treatment assembly is installed in the blended wing body aircraft.

The acoustic treatment assembly of any of the preceding clauses, wherein the forward acoustic treatment defines a length, $L_{FAT}$, wherein the first engine defines a length, $L_E$, and wherein the length, $L_{FAT}$, is at least 5% of the length, $L_E$, and up to 100% of the length, $L_E$.

The acoustic treatment assembly of any of the preceding clauses, wherein the aft acoustic treatment defines a length, $L_{AAT}$, wherein the first engine defines a length, $L_E$, and wherein the length, $L_{AAT}$, is at least 5% of the length, $L_E$, and up to 100% of the length, $L_E$.

The acoustic treatment assembly of any of the preceding clauses, wherein the aft acoustic treatment is formed of a high temperature material.

The acoustic treatment assembly of any of the preceding clauses, further comprising: an anti-icing assembly, the anti-icing assembly including a heater in thermal communication with the forward acoustic treatment, the aft acoustic treatment, or both.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A blended wing body aircraft defining a longitudinal direction, a lateral direction, and a vertical direction, the blended wing body aircraft comprising:

a pair of wings;

a body, the pair of wings extending outward from the body along the lateral direction, the body defining a top side along the vertical direction; and a propulsion system comprising a mounting structure and a first engine mounted to the body on the top side of the body with the mounting structure, the body including an acoustic treatment assembly forward of the first engine, aft of the first engine, or both, wherein the mounting structure is spaced from the acoustic treatment assembly such that a portion of the top side of the body to which the mounting structure is mounted is free of the acoustic treatment assembly, wherein the first engine includes a forward end and an aft end, wherein the acoustic treatment assembly includes a forward acoustic treatment positioned at the forward end of the first engine on a surface of the body and an aft acoustic treatment positioned at the aft end of the first engine.

2. The blended wing body aircraft of claim 1, wherein the forward acoustic treatment defines a length, $L_{FAT}$, along the longitudinal direction, wherein the first engine defines a length, $L_E$, along the longitudinal direction, and wherein the length, $L_{FAT}$, is at least 5% of the length, $L_E$, and up to 100% of the length, $L_E$.

3. The blended wing body aircraft of claim 1, wherein the forward acoustic treatment overlaps with the forward end of the first engine along the longitudinal direction.

4. The blended wing body aircraft of claim 1, wherein the aft acoustic treatment defines a length, $L_{AAT}$, along the longitudinal direction, wherein the first engine defines a length, $L_E$, along the longitudinal direction, and wherein the length, $L_{AAT}$, is at least 5% of the length, $L_E$, and up to 100% of the length, $L_E$.

5. The blended wing body aircraft of claim 1, wherein the aft acoustic treatment overlaps with the aft end of the first engine along the longitudinal direction.

6. The blended wing body aircraft of claim 1, wherein the body includes a fuselage having an aft edge and a fuselage extension extending aft from the aft edge, wherein the aft acoustic treatment is positioned at least partially on or within the fuselage extension.

7. The blended wing body aircraft of claim 1, wherein the aft acoustic treatment is formed of a high temperature material.

8. The blended wing body aircraft of claim 1, wherein the forward acoustic treatment or the aft acoustic treatment comprises a perforated sheet and a hollow body.

9. The blended wing body aircraft of claim 1, wherein the forward acoustic treatment or the aft acoustic treatment comprises a closed-cell body.

10. The blended wing body aircraft of claim 1, wherein the blended wing body aircraft further comprises:

an anti-icing assembly, the anti-icing assembly including a heater in thermal communication with the forward acoustic treatment, the aft acoustic treatment, or both.

11. The blended wing body aircraft of claim 1, wherein the propulsion system further comprises a second engine mounted to the body on the top side of the body and spaced from the first engine along the lateral direction, wherein the acoustic treatment assembly is also positioned forward of the second engine, aft of the second engine, or both.

12. The blended wing body aircraft of claim 1, wherein during a cruise operating condition of the blended wing body aircraft, the body contributes between 10% and 95% of an upward lift for the aircraft.

13. An acoustic treatment assembly for a blended wing body aircraft, the blended wing body aircraft comprising a body, a pair of wings extending outward from the body, and a propulsion system, the propulsion system comprising a mounting structure and a first engine mounted to the body on a top side of the body with the mounting structure, the acoustic treatment assembly comprising:

a forward acoustic treatment configured to be positioned at a forward end of the first engine and spaced from the mounting structure when the acoustic treatment assembly is installed in the blended wing body aircraft; and an aft acoustic treatment configured to be positioned at an aft end of the first engine and spaced from the mounting structure when the acoustic treatment assembly is installed in the blended wing body aircraft.

14. The acoustic treatment assembly of claim 13, wherein the forward acoustic treatment defines a length, $L_{FAT}$, wherein the first engine defines a length, $L_E$, and wherein the length, $L_{FAT}$, is at least 5% of the length, $L_E$, and up to 100% of the length, $L_E$.

15. The acoustic treatment assembly of claim 13, wherein the aft acoustic treatment defines a length, $L_{AAT}$, wherein the first engine defines a length, $L_E$, and wherein the length, $L_{AAT}$, is at least 5% of the length, $L_E$, and up to 100% of the length, $L_E$.

16. The acoustic treatment assembly of claim 13, wherein the aft acoustic treatment is formed of a high temperature material.

17. The acoustic treatment assembly of claim 13, further comprising:

an anti-icing assembly, the anti-icing assembly including a heater in thermal communication with the forward acoustic treatment, the aft acoustic treatment, or both.

\* \* \* \* \*